(12) United States Patent
Maguire (10) Patent No.: US 6,478,388 B2
(45) Date of Patent: Nov. 12, 2002

(54) SEAL ARRANGEMENT FOR A TRACK TYPE WORK MACHINE AND AN ASSOCIATED METHOD FOR PRODUCING A SEAL ARRANGEMENT

(75) Inventor: Roy L. Maguire, Edelstein, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/795,591

(22) Filed: Feb. 28, 2001

(65) Prior Publication Data

US 2002/0117075 A1 Aug. 29, 2002

(51) Int. Cl.⁷ .............................................. B62D 55/21
(52) U.S. Cl. ........................ 305/103; 305/100; 305/202
(58) Field of Search ................................ 305/100, 102, 305/103, 104, 105, 106, 202, 59; 277/381, 391, 587, 641, 642

(56) References Cited

U.S. PATENT DOCUMENTS

| | | | |
|---|---|---|---|
| 3,180,650 A | * | 4/1965 | Liebig |
| 3,455,566 A | * | 7/1969 | Hull et al. |
| 3,985,366 A | | 10/1976 | Plouzek |
| 4,007,972 A | * | 2/1977 | Baylor |
| 4,083,569 A | | 4/1978 | Negro |
| 4,094,516 A | * | 6/1978 | Morley et al. |
| 4,126,359 A | * | 11/1978 | Holze |
| 4,199,199 A | * | 4/1980 | Granda |
| 4,262,914 A | * | 4/1981 | Roley |
| 4,436,315 A | | 3/1984 | Hatch et al. |
| 4,828,274 A | * | 5/1989 | Stannard |
| 5,711,586 A | | 1/1998 | Anderton et al. |
| 6,047,969 A | | 4/2000 | Hoefft et al. |

FOREIGN PATENT DOCUMENTS

| | | |
|---|---|---|
| DE | 1425455 | 12/1969 |
| DE | 2360069 | 6/1974 |
| GB | 2078313 | 1/1982 |

* cited by examiner

Primary Examiner—Russell D. Stormer
(74) Attorney, Agent, or Firm—Maginot, Addison & Moore; Calvin E Glastetter; Jeff A Greene (57) ABSTRACT

A seal arrangement is disclosed. The seal arrangement includes a seal groove having a central axis. The seal groove is defined by at least a first wall segment, a second wall segment, and a third wall segment interposed the first wall segment and the second wall segment. The first wall segment is angled relative to the central axis so that a linear extension of a surface of the first wall segment intersects the central axis so as to define an angle α therebetween. An associated method of producing a seal arrangement is also provided.

20 Claims, 7 Drawing Sheets

SEAL ARRANGEMENT FOR A TRACK TYPE WORK MACHINE AND AN ASSOCIATED METHOD FOR PRODUCING A SEAL ARRANGEMENT

TECHNICAL FIELD

This invention relates generally to track type work machines, and more particularly to a seal arrangement for track type work machines and an associated method for producing a seal arrangement.

BACKGROUND ART

Track type work machines typically have a sprocket, an idler, and a track chain assembly. During use of the work machine the sprocket rotates and engages the track chain assembly, thereby causing the track chain assembly to rotate around a path defined by the sprocket and the idler. The rotation of the track chain assembly causes the work machine to be propelled over the ground so as to perform various work functions.

Track chain assemblies generally include a pair of parallel chains, with each parallel chain being made up of a series of entrained track links. Track chain assemblies further include a series of bushings and track pins interposed between and connected to the parallel chains. The bushings and the entrained track links cooperate to form a number of track joints which allow the necessary movement of the bushings relative to the track links during use of the track chain assembly, for example, when the track chain assembly rotates about the sprocket and the idler.

Track joints are typically equipped with a track seal assembly to keep out various corrosive and abrasive mixtures of water, dirt, sand, rock or other mineral or chemical elements to which the track chain is exposed during its use. The track seal assembly also functions to keep a lubricant within the track joint to facilitate the aforementioned relative movement of the bushings and the track links.

One prior art track seal assembly design used to accomplish the aforementioned functions employs a seal groove with a load member and a seal member positioned within the seal groove. The seal member is axially urged into sliding sealing engagement against a polished face (e.g. a bushing face) by the resilient load member. However, a number of problems have been encountered using the above-described arrangement.

One such problem relates to positioning the load and seal members into the seal groove. In particular, the physical configuration of the seal groove, the load member, and the seal member makes it difficult to properly seat the load and seal members into the seal groove. In particular, the configuration of these components makes it difficult to automate the process of positioning the load and seal members into the seal groove. The above-discussed problem increases the difficulty and expense of manufacturing track seal assemblies.

The present invention is directed to overcoming one or more of the problems or disadvantages associated with the prior art.

DISCLOSURE OF THE INVENTION

In accordance with one embodiment of the present invention, there is provided a seal arrangement. The seal arrangement includes a seal groove having a central axis. The seal groove is defined by at least a first wall segment, a second wall segment, and a third wall segment interposed the first wall segment and the second wall segment. The first wall segment is angled relative to the central axis so that a linear extension of a surface of the first wall segment intersects the central axis so as to define an angle $\alpha$ therebetween.

In accordance with another embodiment of the present invention, there is provided a work machine. The work machine includes a track pin having a central axis. The work machine also includes a seal groove positioned in a concentric relationship with the track pin. The seal groove is defined by at least a first wall segment, a second wall segment, and a third wall segment interposed the first wall segment and the second wall segment. A vertical axis intersects the central axis so as to define a substantially 90° angle $\sigma 0$ therebetween. A linear extension of a surface of the first wall segment intersects the vertical axis so as to define an acute angle $\beta$ therebetween.

In accordance with still another embodiment of the present invention, there is provided a method of producing a seal arrangement. The method includes the step of inserting a load member into a seal groove having a central axis, the seal groove being defined by at least a first wall segment, a second wall segment, and a third wall segment interposed the first wall segment and the second wall segment. The first wall segment of the seal groove is angled relative to the central axis such that a linear extension of a surface of the first wall segment intersects the central axis so as to define an angle $\alpha$ therebetween.

In accordance with yet another embodiment of the present invention, there is provided a seal arrangement. The seal arrangement includes a track link. The seal arrangement also includes a seal groove defined in the track link. The seal groove has a central axis. The seal groove is defined by a first wall segment and a second wall segment. The first wall segment is angled relative to the central axis so that a linear extension of a surface of the first wall segment intersects the central axis so as to define an angle $\Gamma$ therebetween.

BEST MODE FOR CARRYING OUT THE INVENTION

Figure 1:
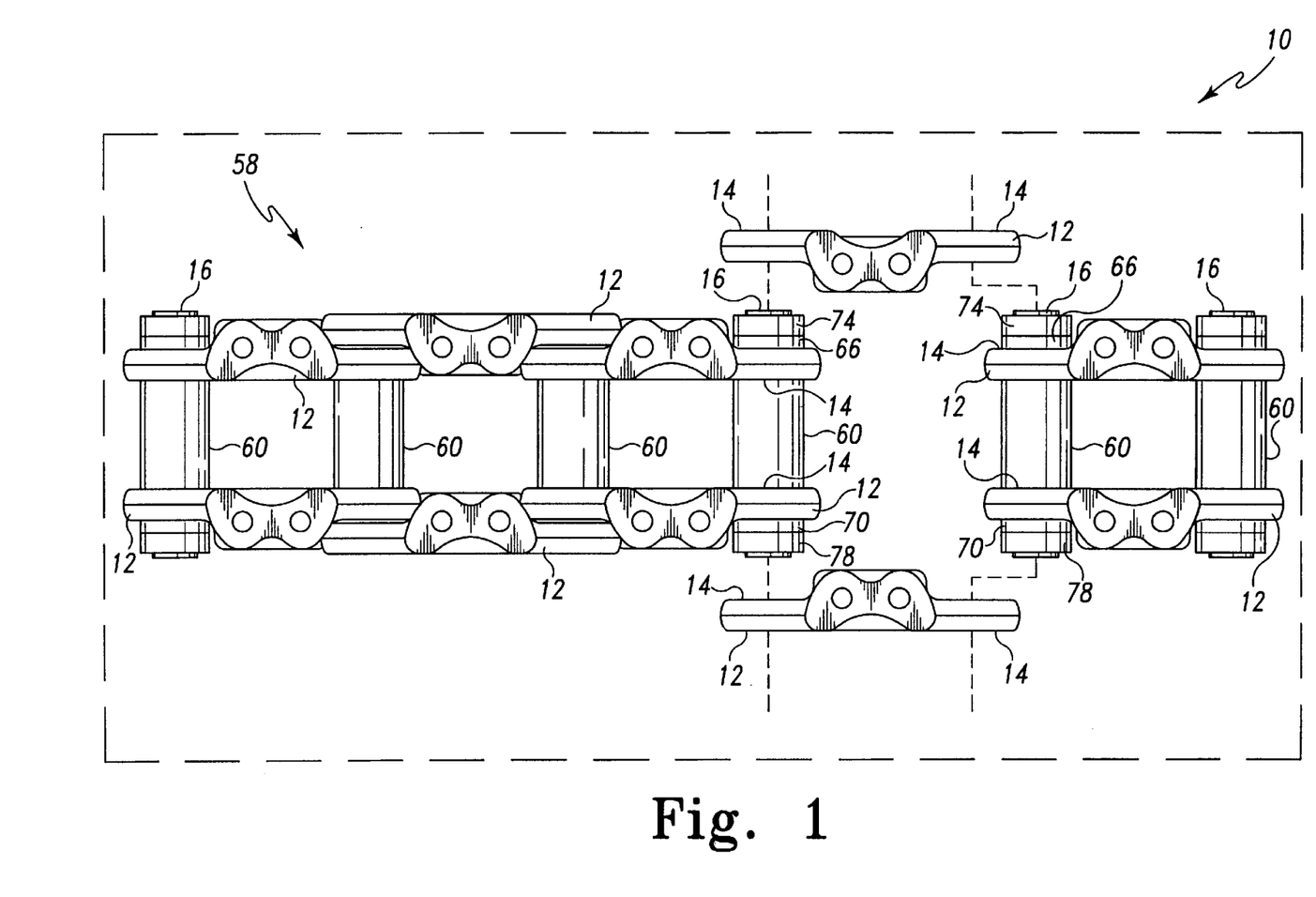
FIG. 1 is a schematic representation of a work machine that incorporates the features of the present invention therein.

Referring now to FIG. 1 there is shown a work machine 10 which incorporates the features of the present invention therein. Work machine 10 includes a track chain 58. Track chain 58 includes a plurality of substantially identical cartridge assemblies 60. Track chain 58 also includes a plurality of substantially identical track links 12. Each track link 12 has a pair of apertures 14 defined therein.

Figure 2:
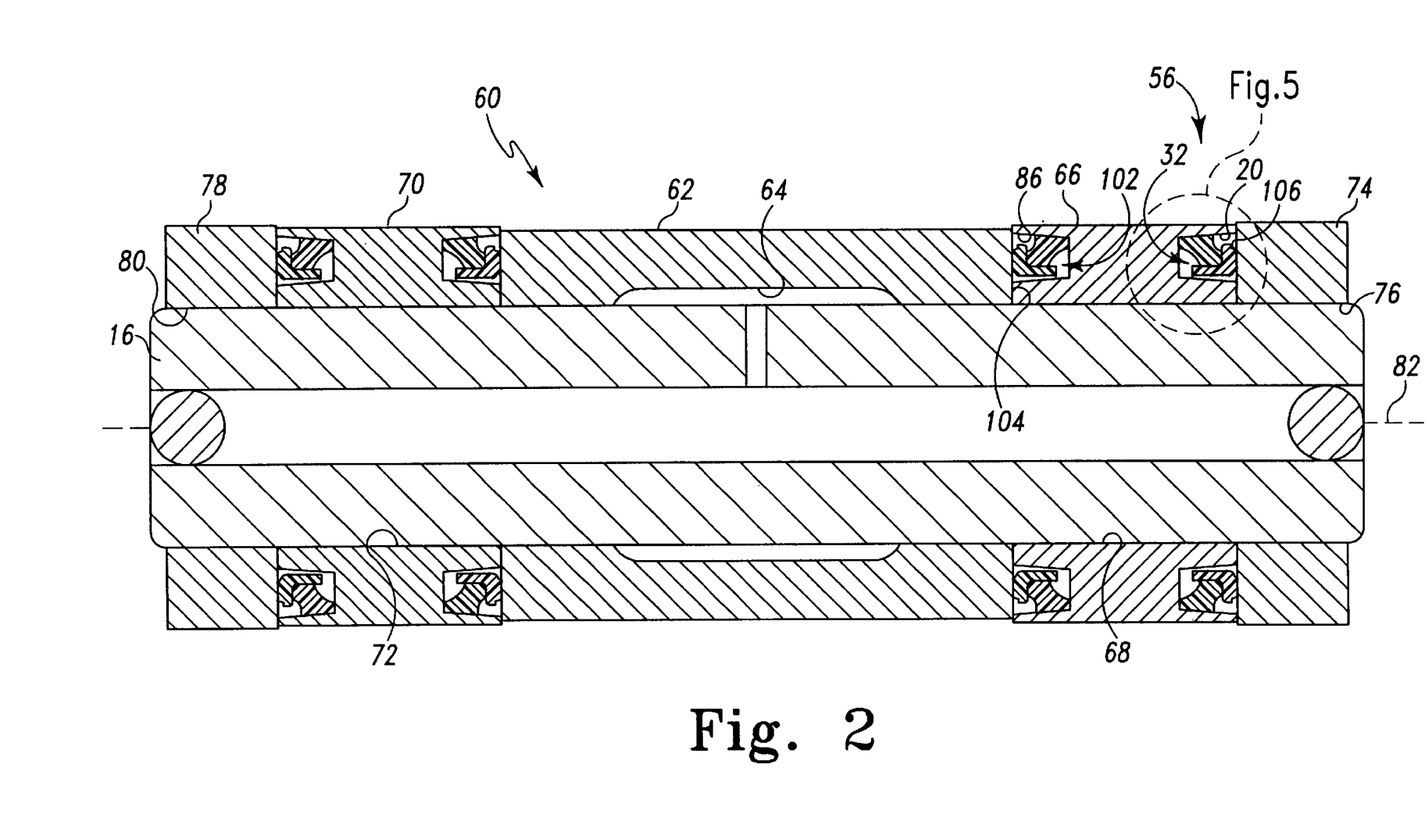
FIG. 2 is a longitudinal cross sectional view of a cartridge assembly of the track chain assembly shown in FIG. 1.

As shown in FIG. 2, each cartridge assembly 60 includes a bushing 62 having a passageway 64 defined therethrough, a track pin 16 having a central axis 82, an insert 66 having a bore 68 defined therethrough, and an insert 70 having a bore 72 defined therethrough. It should be appreciated that insert 66 is substantially identical to insert 70, therefore only insert 66 is described in detail herein. Each cartridge assembly 60 also includes a collar 74 having a hole 76 defined therein. Each cartridge assembly 60 also includes another collar 78 which is substantially identical to collar 74. In particular, collar 78 also has a hole 80 defined therein.

Figure 3:
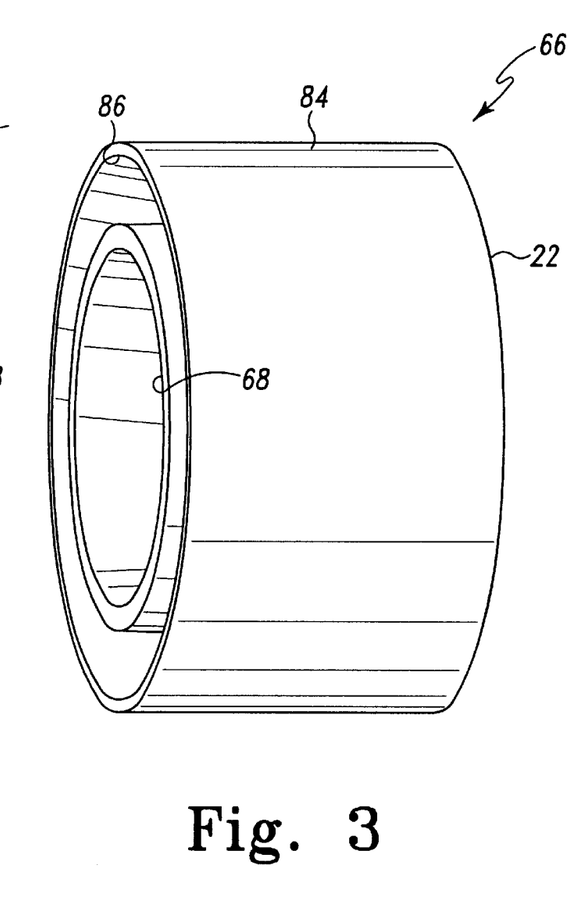
FIG. 3 is a perspective view of an insert of the cartridge assembly shown in FIG. 2.
Figure 4:
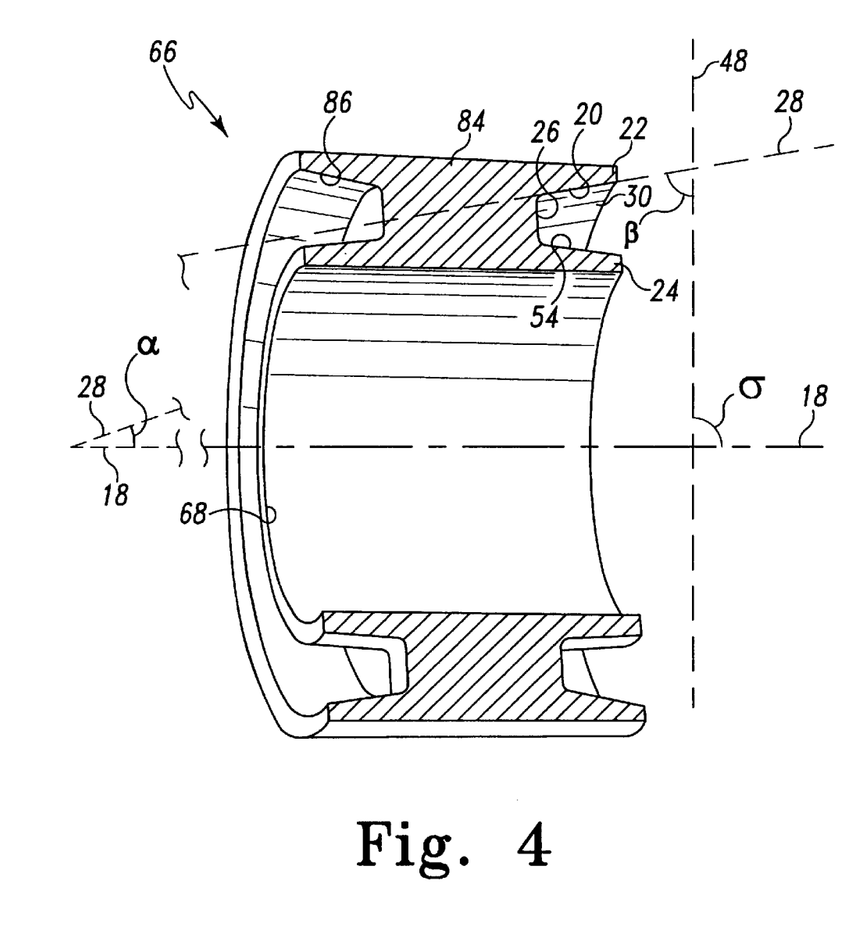
FIG 4 a cross sectional view of the insert shown in FIG. 3.

As shown more clearly in FIGS. 3 and 4, insert 66 includes a ring member 84 which has a central axis 18. Ring member 84 has a pair of seal grooves 20 and 86 formed therein. Seal grooves 20 and 86 are positioned on ring member 84 such that central axis 18 is also the central axis of the ring defined by seal groove 20 and the ring defined by seal groove 86. In other words, seal grooves 20 and 86 are concentric with bore 68. It should be appreciated that seal groove 86 is substantially identical to seal groove 20, thus only seal groove 20 will be described in detail herein. In particular, as shown in FIG. 4, seal groove 20 is defined by a wall segment 22, a wall segment 24, and a wall segment 26 interposed wall segment 22 and wall segment 24. Wall segment 22 is positioned at an angle relative to central axis 18 so that a linear extension 28 of a surface 30 of wall segment 22 intersects central axis 18 so as to define an angle α therebetween. For example, wall segment 22 can be angled relative to central axis 18 so that the angle α is about 5°. However, it should be understood that angles greater or less than 5° are contemplated as long as linear extension 28 is not in a parallel relationship with central axis 18. In addition, the spatial relationship between wall segment 22 and central axis 18 can be described relative to a vertical axis 48 that intersects central axis 18 so as to define a substantially 90° angle α therebetween. Wall segment 22 is positioned at an angle relative to vertical axis 48 so that linear extension 28 of surface 30 intersects vertical axis 48 so as to define an acute angle β therebetween.

Figure 8:
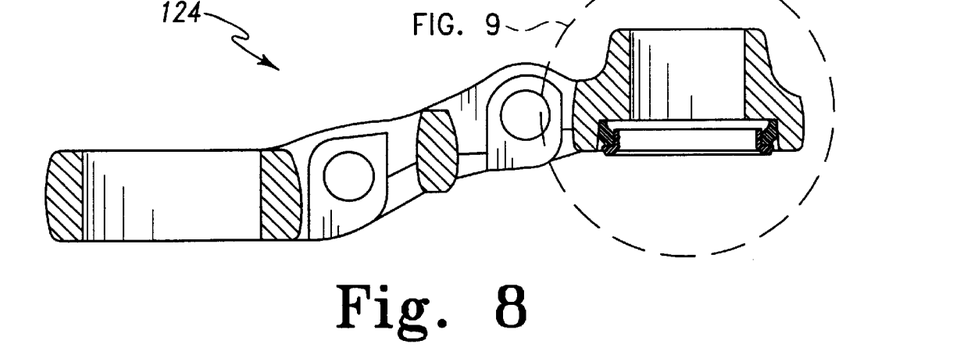
FIG. 8 is a top cross sectional view of a track link which incorporates the features of the present invention therein.

The configuration of seal groove 20 can also be used in a counter bore of a track link 124, as shown in FIG. 8. As shown more clearly in FIG. 9, a seal groove 108 is defined by a wall segment 110 and a wall segment 112. Wall segment 110 is positioned at an angle relative to a central axis 118 of seal groove 108 so that a linear extension 122 of a surface 120 of wall segment 110 intersects central axis 118 so as to define an angle Γ therebetween. For example, wall segment 110 can be angled relative to central axis 118 so that the angle Γ is about 5°. However, it should be understood that angles greater or less than 5° are contemplated as long as linear extension 122 is not in a parallel relationship with central axis 118. In addition, the spatial relationship between wall segment 110 and central axis 118 can be described relative to a horizontal axis 130 that intersects central axis 118 so as to define a substantially 90° angle ε therebetween. Wall segment 110 is positioned at an angle relative to horizontal axis 130 so that linear extension 122 of surface 120 intersects horizontal axis 130 so as to define an acute angle η therebetween.

Figure 5:
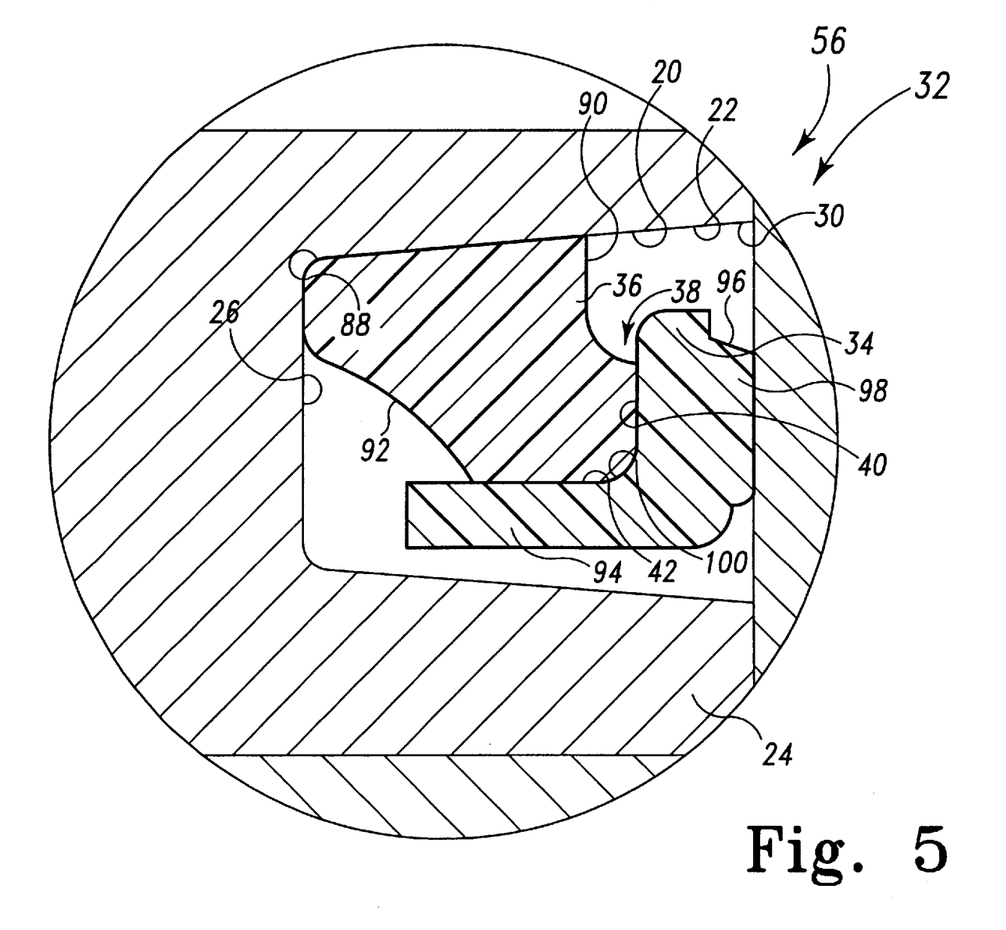
FIG. 5 is an enlarged view of a portion of FIG. 2 which is encircled and indicated as FIG. 5.
Figure 6:
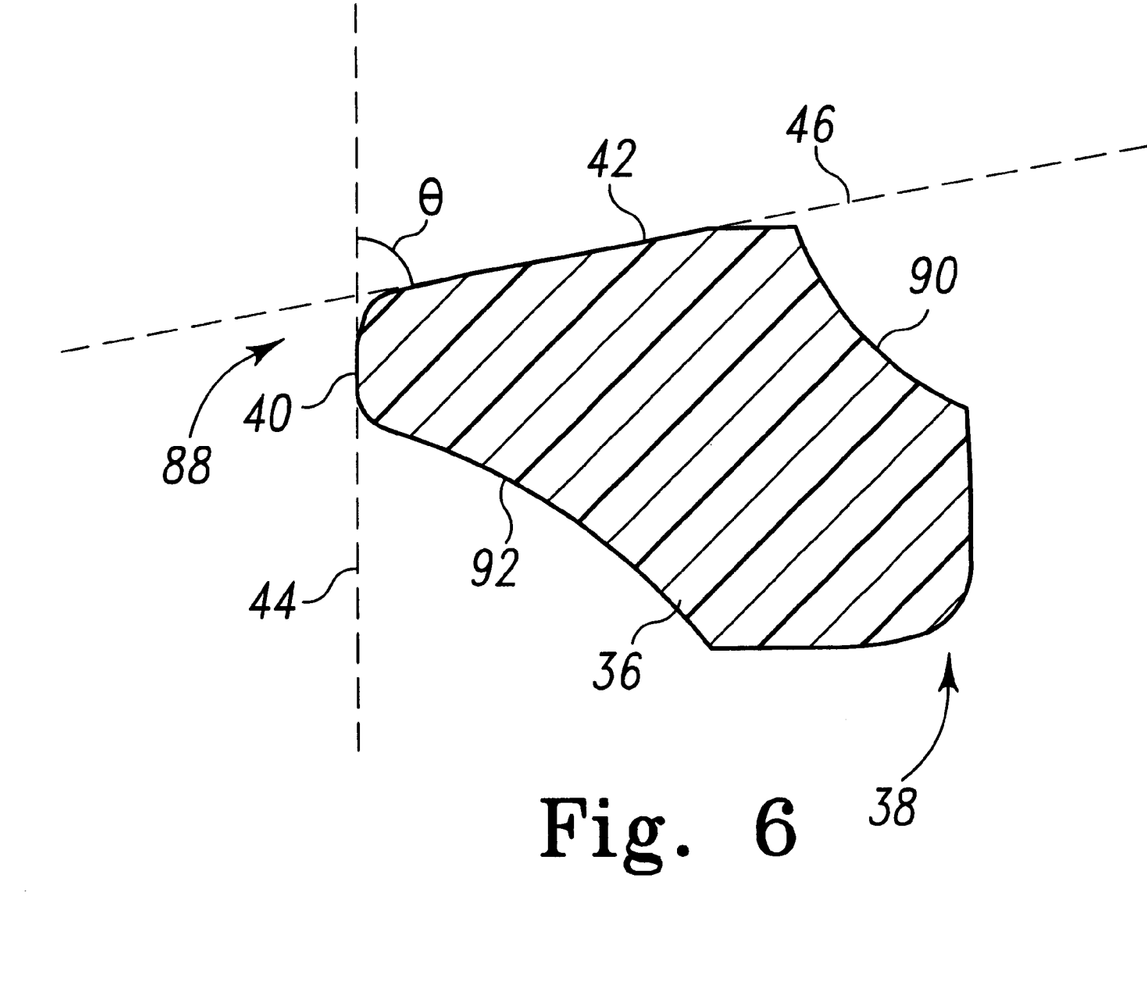
FIG. 6 is an enlarged view of the load member shown in FIG. 5.

Now referring to FIGS. 5 and 6, a seal assembly 32 is positioned in seal groove 20. Seal assembly 32 and seal groove 20 cooperate to form seal arrangement 56 of the present invention. Seal assembly 32 includes a load member 36 and a seal member 34. Both load member 36 and seal member 34 are ring shaped so as to fit into seal groove 20. As more clearly shown in the cross sectional view of FIG. 6, load member 36 includes a nose portion 38 and an end portion 88. Load member 36 also includes a concave side wall 90 and a concave side wall 92 interposed nose portion 38 and end portion 88. End portion 88 is defined by an end wall 40 and an end wall 42. End wall 40 is connected to end wall 42 so that a linear extension 44 of end wall 40 intersects a linear extension 46 of end wall 42 so as to define an acute angle θ therebetween. For example, end wall 40 can be positioned relative to end wall 42 so that the angle θ is about 83°. However, it should be understood that angles greater or less than 83° are contemplated as long as an acute angle is defined between linear extension 44 and linear extension 46. However, it is preferred that the above described acute angle β is greater than acute angle θ.

As shown in FIG. 5, seal member 34 has a generally "L" shaped cross section. In particular, seal member 34 has a leg portion 94 connected to a leg portion 96 so as to define a receptacle 100 therebetween. Seal member 34 also has a lip 98 extending outwardly from leg portion 96.

Still referring to FIG. 5, load member 36 is inserted into seal groove 20 so that end portion 88 contacts wall segments 22 and 26 of seal groove 20. Seal member 34 is also positioned within seal groove 20 so that nose portion 38 of load member 36 contacts seal member 34. In particular, nose portion 38 is positioned within receptacle 100 and contacts leg portions 94 and 96. Positioning load member 36 and seal member 34 within seal groove 20 in the above described manner results in leg portion 96 and lip 98 extending outwardly from seal groove 20 about 2.5 millimeters (not shown in FIG. 5).

Figure 7:
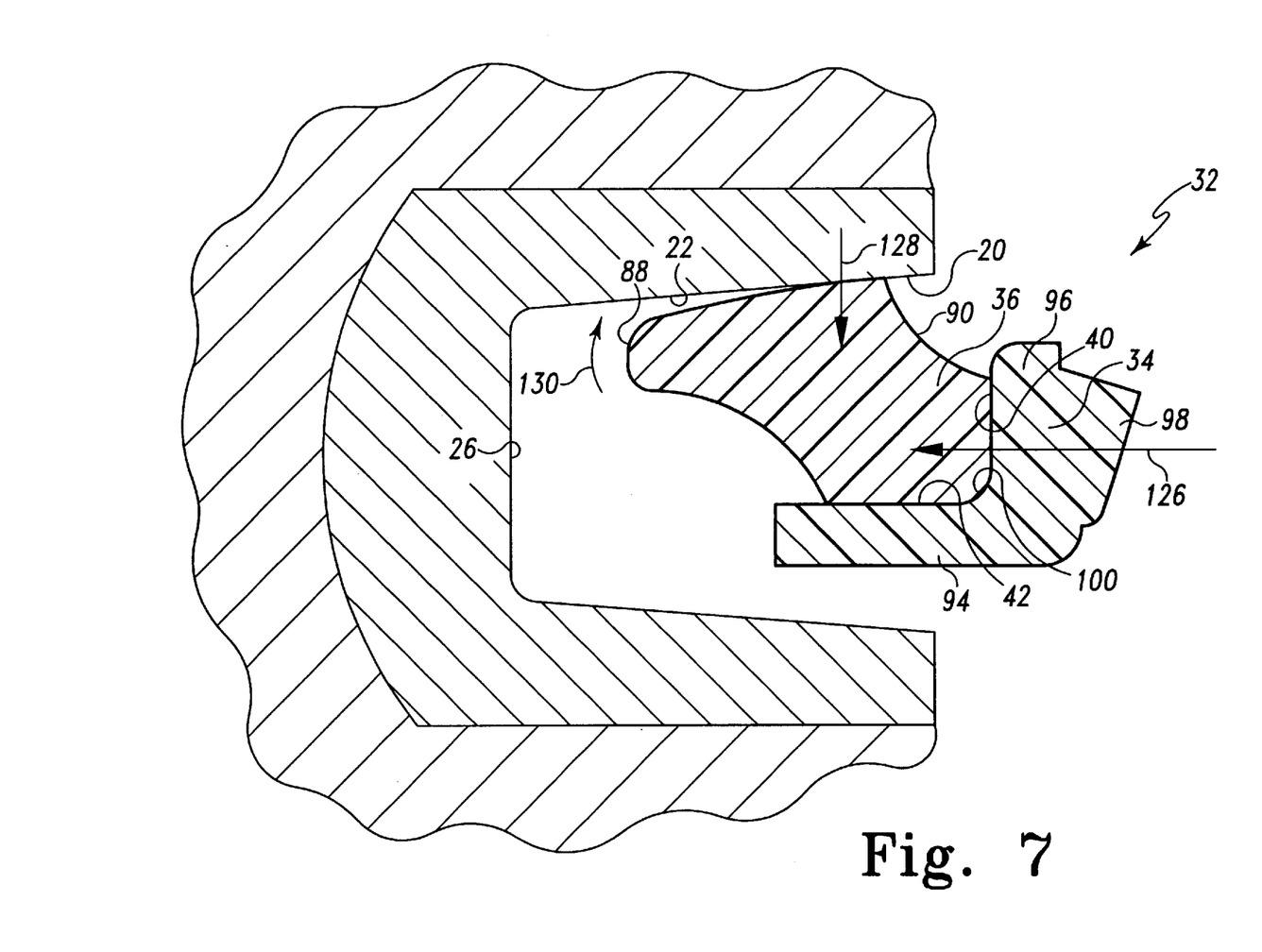
FIG. 7 is a fragmentary view similar to FIG. 5 showing a load member and a seal member in the process of being inserted into a seal groove.
Figure 9:
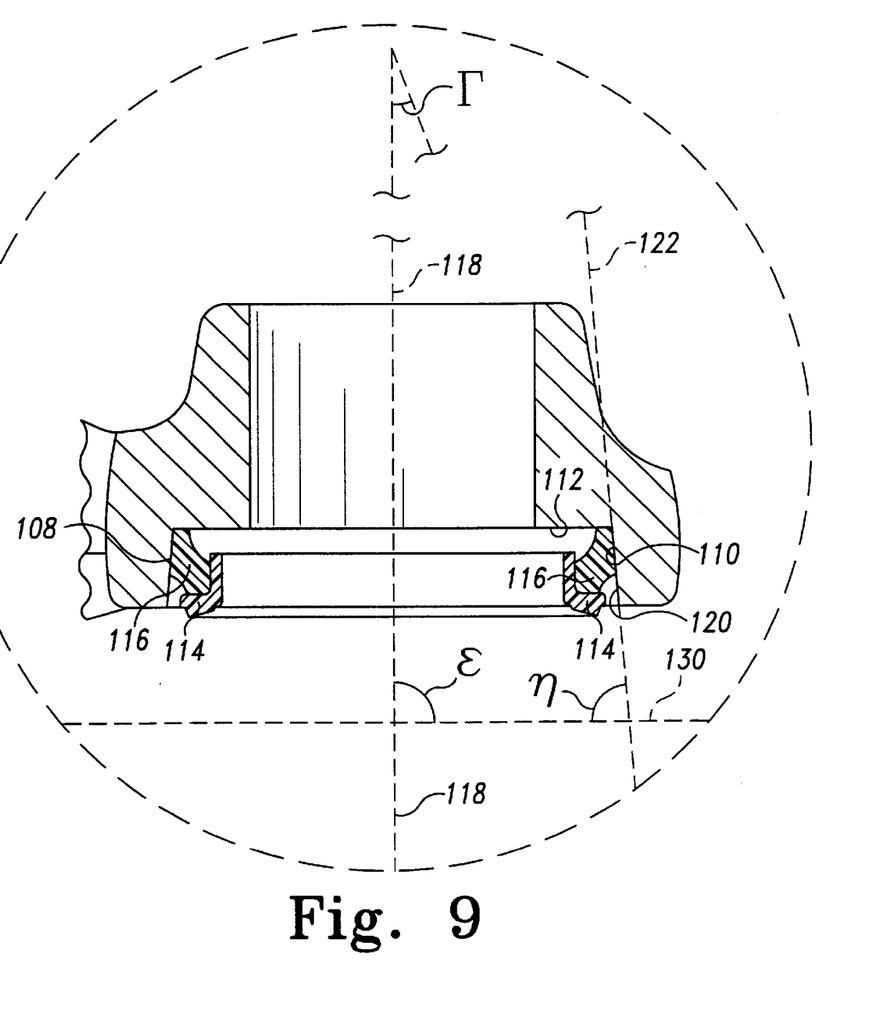
FIG. 9 is an enlarged view of a portion of FIG. 8 which is encircled and indicated as FIG. 9.

It should be appreciated that load member 36 and seal groove 20 of the present invention cooperate to prevent or substantially inhibit a phenomenon known as "heel under" when load member 36 and seal member 34 are being inserted into seal groove 20. "Heel under" occurs when a portion of a prior art load member folds radially inward as it is inserted into a prior art seal groove. This situation can cause uneven face load distribution around a seal lip perimeter resulting in leakage. In contrast, as previously mentioned, the present invention prevents or substantially inhibits "heel under". In particular, as shown in FIG. 7, when load member 36 and seal member 34 are advanced into seal groove 20 as indicated by arrow 126, the motion results in a radial force in the direction indicated by arrow 128 because of the interference between load member 36 and seal groove 20. This initiates an outward rotation motion of end portion 88 in the direction indicated by arrow 130 which prevents or substantially inhibits "heel under". Note that, as shown in FIG. 9, a seal assembly having the same "heel under" preventing attributes as seal assembly 32 can be inserted into seal groove 108 of track link 124. Note that track link 124 is a standard link but for the configuration of seal groove 108 and a seal assembly substantially identical to seal assembly 32 of FIG. 7.

As shown in FIG. 2, a seal assembly 102 which is substantially identical to seal assembly 32 is disposed in seal groove 86 in a substantially identical manner as described above for seal groove 20. Track pin 16 is located within bore 68 of insert 66 such that seal groove 20, and therefore seal groove 86, are positioned in a concentric relationship with track pin 16. In addition, track pin 16 is positioned within passageway 64 of bushing 62 so that a bushing face 104 is in an opposing relationship with seal groove 86. Track pin 16 is also positioned within hole 76 of collar 74 so that (i) insert 66 is interposed bushing 62 and collar 74 and (ii) seal groove 20 is in an opposing relationship with a collar face 106. Collar 74 is secured to track pin 16 so that collar 74 can not rotate relative to track pin 16. However, both bushing 62 and insert 66 are able to rotate relative to track pin 16. Positioning bushing 62, insert 66, and collar 74 in the above described manner results in (i) lip 98 of seal member 34 being urged against collar face 106 so as to define a seal therebetween and (ii) the lip of the seal member of seal assembly 102 being urged against bushing face 104 so as to define a seal therebetween. Urging the lips of the seal members in the above described manner causes the lips to be pushed back into their respective seal grooves such that they no longer extend 2.5 millimeters outwardly therefrom.

Seal assemblies substantially identical to seal assembly 32 are positioned within seal grooves defined in insert 70 in a substantially identical manner as described above for insert 66 and therefore will not be discussed in detail herein. As shown in FIG. 2, track pin 16 is also inserted into bore 72 of insert 70 and hole 80 of collar 78 in a substantially identical manner as described above for insert 66 and collar 74, and therefore will not be discussed in detail herein.

Once a number of cartridge assemblies 60 are assembled in the above described manner, the cartridge assemblies 60 and the track links 12 are assembled to form track chain 58 as shown in FIG. 1. In particular, one end of a cartridge assembly 60 is secured to two track links 12 by positioning insert 66 of the cartridge assembly 60 in one aperture 14 of one track link 12, and then positioning collar 74 of the cartridge assembly 60 in one aperture 14 of another track link 12. The other end of the cartridge assembly 60 is also secured to two other track links 12 utilizing the insert 70 and collar 78 in a substantially identical manner as that described for insert 66 and collar 78. The free ends of each track link 12 secured to the cartridge assembly 60 are then secured to another cartridge assembly 60 in a substantially identical manner. This process continues until track chain 58 is formed.

Industrial Applicability

It should be understood that the physical configuration of seal groove 20 and load member 36 decreases the difficulty and expense of manufacturing seal arrangement 56. For example, having wall segment 22 positioned at an angle relative to central axis 18 so that linear extension 28 of surface 30 of wall segment 22 intersects central axis 18 thereby defining angle α therebetween makes it much easier to insert load member 36 and seal member 34 into seal groove 20 (i.e. prevents or substantially inhibits "heel under") when constructing seal arrangement 56 as compared to seal arrangements which are configured so that a wall segment analogous to wall segment 22 is positioned in a substantially parallel relationship with the central axis, i.e. a linear extension of the wall segment does not intersect the central axis.

Moreover, having load member 36 configured such that end wall 40 is connected to end wall 42 so that linear extension 44 of end wall 40 intersects linear extension 46 of end wall 42 so as to define an acute angle θ therebetween further enhances the ease with which load member 36 and seal member 34 can be inserted into seal groove 20. The aforementioned attributes of seal arrangement 56 facilitate the insertion of load member 36 and seal member 34 to a degree that the insertion of these components into seal groove 20 can be automated. In other words, the above described configuration of seal arrangement 56 results in a situation where a machine can be utilized to insert load member 36, alone or along with seal member 34, into seal groove 20 as opposed to inserting these components by hand. However, it should be appreciated that inserting these components into seal groove 20 by hand is still made easier by the present invention and thus is still contemplated.

While seal arrangement 56 was described above in the context of being used in a cartridge assembly of a track chain 58, it should be understood that seal arrangement 56 can be employed, and therefore the advantages realized, in practically any situation where a load member, alone or along with a seal member, needs to be inserted into a seal groove.

Other aspects and features of the present invention can be obtained from a study of the drawings, the disclosure, and the appended claims.

What is claimed is:

1. A seal arrangement, comprising:
   a member defining a central axis and having at least one radially extending end;
   a seal groove positioned in the radially extending end of said member, said seal groove is defined by at least a first wall segment, a second wall segment, and a third wall segment interposed said first wall segment and said second wall segment,
   wherein said third wall segment is normal to said central axis and said first wall segment is angled relative to said central axis so that a linear extension of a surface of said first wall segment intersects said central axis so as to define an angle α therebetween.

2. The seal arrangement of claim 1, wherein:
   said angle α is about 5°.

3. The seal arrangement of claim 1, further comprising:
   a seal assembly positioned within said seal groove,
   wherein said seal assembly includes a seal member and a load member.

4. The seal arrangement of claim 3, wherein:
   said load member has an end portion defined by a first end wall and a second end wall,
   said first end wall is connected to said second end wall, and
   a linear extension of said first end wall intersects a linear extension of said second end wall so as to define an acute angle θ therebetween.

5. The seal arrangement of claim 4, wherein:
   said angle θ is about 83°.

6. The seal arrangement of claim 4, wherein:
   said load member includes a nose portion and said load member is located relative to said seal member so that said nose portion is positioned in contact with said seal member.

7. The seal arrangement of claim 4, wherein:
   a vertical axis intersects said central axis so as to define a substantially 90° angle σ therebetween,
   said linear extension of said surface of said first wall segment intersects said vertical axis so as to define an acute angle β therebetween, and
   said acute angle β is greater than said acute angle θ.

8. A work machine, comprising:
   a track pin having a central axis;
   a member concentrically disposed about said track pin and having at least one radially extending end; and
   a seal groove positioned in the radially extending end of said member in concentric relationship with said track pin, said seal groove is defined by at least a first wall segment, a second wall segment, and a third wall segment interposed said first wall segment and said second wall segment, wherein said third wall segment defines a vertical axis that intersects said central axis so as to define a substantially 90° angle therebetween, and a linear extension of a surface of said first wall segment intersects said vertical axis so as to define an acute angle β therebetween.

9. The work machine of claim 8, further comprising:

a seal assembly positioned within said seal groove, wherein said seal assembly includes a seal member and a load member.

10. The work machine of claim 9, wherein:

said load member has an end portion defined by a first end wall and a second end wall, said first end wall is connected to said second end wall, and a linear extension of said first end wall intersects a linear extension of said second end wall so as to define an acute angle θ therebetween.

11. The work machine of claim 10, wherein:

said angle θ is about 83°.

12. The work machine of claim 10, wherein:

said load member includes a nose portion and said load member is located relative to said seal member so that said nose portion is positioned in contact with said seal member.

13. The work machine of claim 10, wherein:

said acute angle β is greater than said acute angle θ.

14. A method of producing a seal arrangement, comprising the step of:

inserting a load member into a seal groove positioned in a radially extending end of a member, said member having a central axis, said seal groove being defined by at least a first wall segment, a second wall segment, and a third wall segment interposed said first wall segment and said second wall segment, wherein said third wall segment is normal to said central axis and said first wall segment of said seal groove is angled relative to said central axis such that a linear extension of a surface of said first wall segment intersects said central axis so as to define an angle α therebetween.

15. The method of claim 14, further comprising the step of:

positioning said load member in contact with said first wall segment of said seal groove and said third wall segment of said seal groove, wherein (i) said load member includes an end portion having a first end wall and a second end wall, (ii) said first end wall is connected to said second end wall, and (iii) a linear extension of said first end wall intersects a linear extension of said second end wall so as to define an acute angle θ therebetween.

16. The method of claim 14, wherein:

said load member is inserted into said seal groove by a machine.

17. The method of claim 14, further comprising the step of:

positioning a track pin in a concentric relationship with said seal groove.

18. The method of claim 15, wherein:

a vertical axis intersects said central axis so as to define a substantially 90° angle σ therebetween, said linear extension of said surface of said first wall segment intersects said vertical axis so as to define an acute angle β therebetween, and said acute angle β is greater than said acute angle θ.

19. A seal arrangement, comprising:

a track link defining a central axis and having at least one radially extending end, a seal groove positioned in the radially extending end of said track link, said seal groove defined by a first wall segment, a second wall segment, and a third wall segment wherein said third wall segment is positioned so that a linear extension of a surface of said third wall segment is normal to said central axis and said first wall segment is angled relative to said central axis so that a linear extension of a surface of said first wall segment intersects said central axis so as to define an angle Γ therebetween.

20. The seal arrangement of claim 19, wherein:

said angle Γ is about 5°.

* * * * *